3,234,471
APPARATUS FOR THE HANDLING OF INFORMATION EMPLOYING AMPLITUDE AND TIME QUANTIZATION TECHNIQUES
Pierre R. J. Mondon, Paris, France, assignor to Societe Nouvelle d'Electronique, a corporation of France
Filed June 16, 1960, Ser. No. 36,579
Claims priority, application France, June 26, 1959, 798,641, Patent 1,238,333; Apr. 7, 1960, 823,707, Patent 77,493
6 Claims. (Cl. 328—109)

The present invention is concerned with apparatus for the handling of information signals wherein sets of information signals are to be used in digital devices such as for instance, automatic alarm devices, obstacle detection and localization devices which are well known in the radar technique. Generally, systems of the kind described, are usually employed in connection with electromagnetic detection equipment although this combination is not at all the only one contemplated. The data transmitted by an associated radar equipment, for instance, are handled in the inventive devices by delivering digital data readily usable in the circuits to which they are connected.

However, a signal is always mixed with noise which must be eliminated before the signal is transmitted to the handling circuits.

An object of the invention is to provide a system which converts an input wave comprising noise signals and intelligence carrying signals into a series of signals which carry only sets of information which are not amplitude fluctuating and which are properly quantized with respect to the time. Naturally the so obtained useful signals are quantized in amplitude as well as in time. The quantization in amplitude helps in the extraction of intelligence carrying signals out of the surrounding noise. By the time quantization, the position of the already amplitude quantized signals, is accurately determined with respect to a series of clock pulses defining a time quantum, i.e., the shortest time interval of the system, whose duration gives a measure of the accuracy which can be obtained in the determination of the signal position. According to the relative duration of both the quantum and the intelligence carrying signals, this position is more or less accurately known as will be explained later on.

According to the invention, the quantization device delivers a quantized signal pulse whose position must be perfectly located on the time axis with respect to the clock pulses to which it is compared, and of which two successive pulses define a time quantum value. Means are provided for assigning to the output signal one or at most two quanta, according to the position of said signal in the interval as determined by two successive clock pulses. As this position may be difficult to ascertain, each information signal is duplicated, that is, for each received or "object" signal pulse, there is also produced an "image" pulse spaced from the object pulse by a definite time interval, so that two information signals exist among which one is always correctly positioned with respect to the adjacent clock pulses, and a quantum or two adjacent ones can be assigned to the signal.

With this method, each quantum determined by two successive clock pulses is divided into three portions whose width gives the time interval between the "object" signal and its "image" a maximum value. The respective positions of said pulses with respect to the boundaries of the portions and to the clock pulses make it possible to assign without any ambiguity, a definite time quantum to the object pulse or at most, two adjacent quanta.

However, under some conditions, even though the use of two adjacent quanta for positioning a signal prevents the loss of information, such use does not prevent the device from considering a jamming signal as a real signal.

Therefore, in another embodiment of the invention, a clock pulse generator is provided with a frequency higher than before, the value of the time quantum being shorter. The position of the information signal is determined by the position of its leading edge with respect to the nearest clock pulse.

In order that the position of the signal is well determined, this leading edge is shifted so that it is in phase with the next following clock pulse. There cannot be any indeterminate position of a signal which is within a quantum.

Further objects, features and advantages of this invention will suggest themselves to those skilled in the art and will become apparent from the following description of the invention taken in connection with the accompanying drawings in which.

Figure 1:
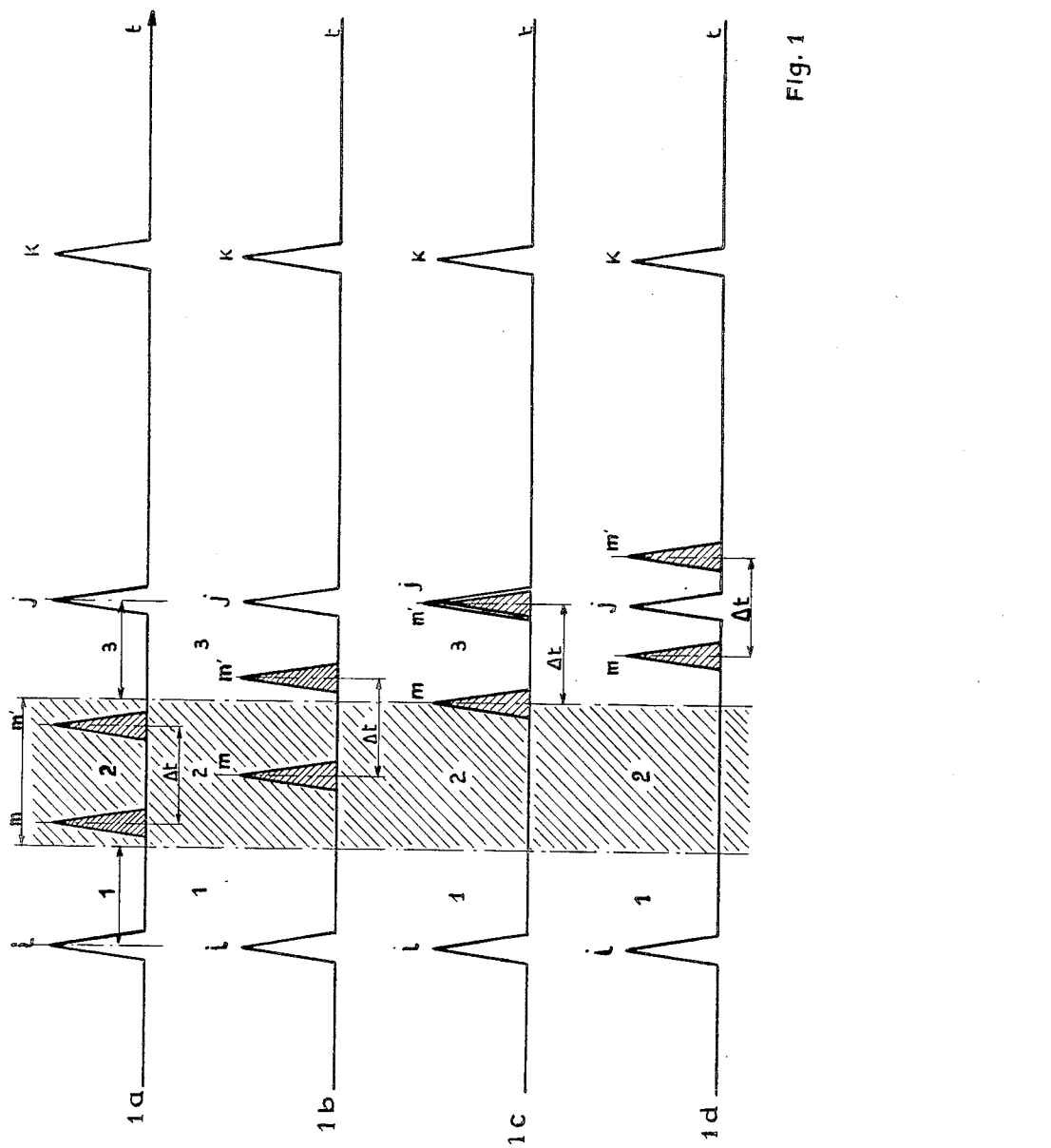
FIGURE 1 is a set of curves showing the method of determination of the time quantum containing the signal pulse according to a first embodiment.

By reference to FIGURE 1, a series of three clock pulses $i$, $j$ and $k$ are considered which define two time quanta. A pulse $m$ representing a single video signal has a position on a time axis $t$ which must be determined with respect to clock pulses like $i$, $j$ and $k$. A determination of this kind is easy when the pulses, whose respective positions are compared, are distinctly separated. But a difficulty arises when the duration of the time quantum is relatively short as compared to the width of the signal pulse, or when the video pulse is very near to a clock pulse. Since the video pulse may fluctuate from time to time as a consequence of the noise, it may happen that the circuits which have to discriminate between these two pulses, the clock pulse and the information pulse, and to assign a determined quantum to the video pulse, cannot be triggered at the desired times. According to the invention, in order that this discrimination may be made, the time quanta such as $i-j$ or $j-k$, etc. are divided into three parts marked 1, 2 and 3 whose duration is a function of the fluctuation amplitude. Pulses received during the intermediate region 2 may be discriminated easily since the time value separating the video pulse from the adjacent clock pulses is great enough with respect to the amplitude of the fluctuation to permit the discriminating circuits to answer correctly to each incoming pulse. But, there may be an indetermination occurring when the video pulse $m$ is placed in regions 1 or 3. To remove this indetermination, an image pulse $m'$ of the object pulse $m$ is provided, these pulses being separated from each other by a time interval $\Delta t$, variable but chosen such that one pulse $m$ or $m'$ can always be discriminated from the adjacent clock pulses.

The curve of FIGURE 1 shows that there is no indetermination when the object pulse and its image pulse $m'$ are both located in the intermediate portion 2. Without doubt, the assigned time quantum for the $m$ pulse is $i-j$. On curve 1b, the image $m'$ of pulse $m$ is located in region 3, but is not overlapping with the clock pulse $j$. Since the comparison circuit responds correctly to the $m$ and $j$ pulses, there is no ambiguity in assigning the $i-j$ quantum to the $m$ pulse. The curve 1c shows an $m$ pulse in an area which is called a "boundary" area, and its image pulse m' is overlapping with the j clock pulse. In this case, the comparison circuit will respond to the pulse m and there will not be any ambiguity. But, in the case of FIGURE 1d, the pulse m and its image m' being located at opposite sides of the clock pulse, the comparison circuit successively answers to the pulses m and m', j and k, because both time quanta i–j and j–k are occupied by signal pulses. An advantage of this arrangement is to permit, in any case, if desired afterwards, a correlation to be made over the bits of information set in homologue positions when several repetition periods are considered. In that case, the bits of information are fluctuating with respect to the time at the boundary between two adjacent quanta and the correlation is achieved by examining in the course of the successive repetition periods, the data which are precisely occupying these homologue quanta. The fact that one is proceeding to duplicate the pulse carrying an information bit, permits a correlation to be made without risk of losing an information bit, which could occur otherwise if at the quanta limit. While only one quantum would have been assigned to an information bit, this information bit may be at one time in one quantum, and at another time in the adjacent one, because of its fluctuation in timing.

In another embodiment of the invention it is possible to avoid duplicating the information carrying pulse. In the previous embodiment, to avoid losing an information bit, there were two quanta allowed for it, resulting in a reduced accuracy. Moreover, in case of jamming, when a correlation is made over several periods of repetition, there is a risk that the apparatus will take this jammer signal as an information bit, since several adjacent quanta will always be occupied.

According to the second embodiment, instead of dividing each time quanta into three parts, a series of clock pulses with a higher frequency is provided which determine a shorter duration time quantum. For the determination of the location of a signal pulse a comparison is made between the respective position of a clock pulse and the leading edge of the signal pulse.

Figure 2:
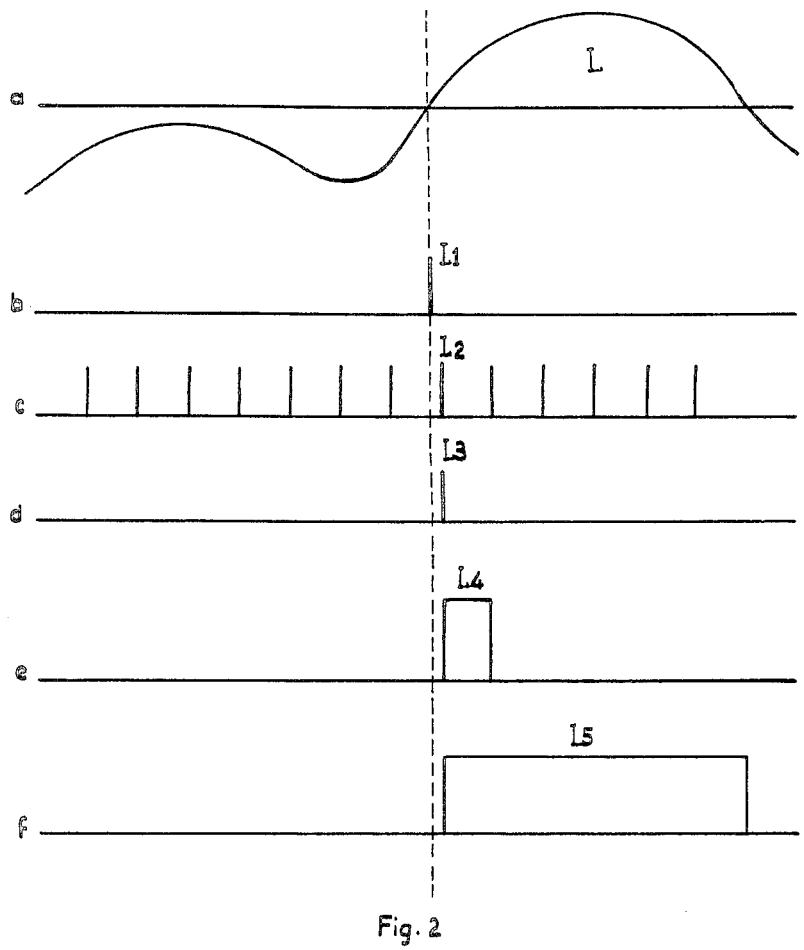
FIGURE 2 is another set of curves showing the method of determination of the time quantum containing the signal pulse according to a second embodiment.

Referring to the curves of FIGURE 2, there is shown on curve 2a a video signal pulse, a portion L of which exceeds the assigned amplitude threshold. This L signal, which carries an information, is transformed into a calibrated short pulse L1 (curve 2b) corresponding to the leading edge of the pulse L.

The clock pulses are represented on curve 2c, and define a time quantum whose duration is shorter than that of pulse L. Pulse L1 is shifted so as to be in phase relation with the clock pulse L2 which is immediately after pulse L1. On curve 2d, pulse L3 represents the result after the shifting of L1 has been made. Pulse L3 is afterwards shaped and becomes pulse L4 and L5 when applied to the utilization circuits.

Figure 3:
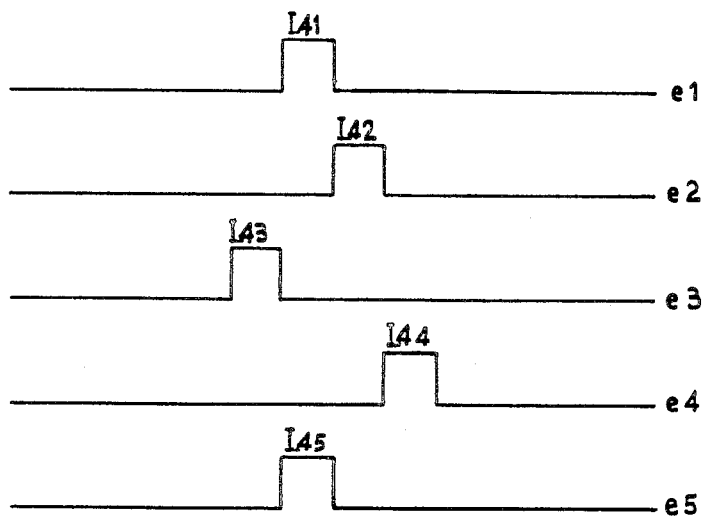
FIGURES 3 and 4 are sets of curves explaining particular points of the second embodiment of the invention.
Figure 4:
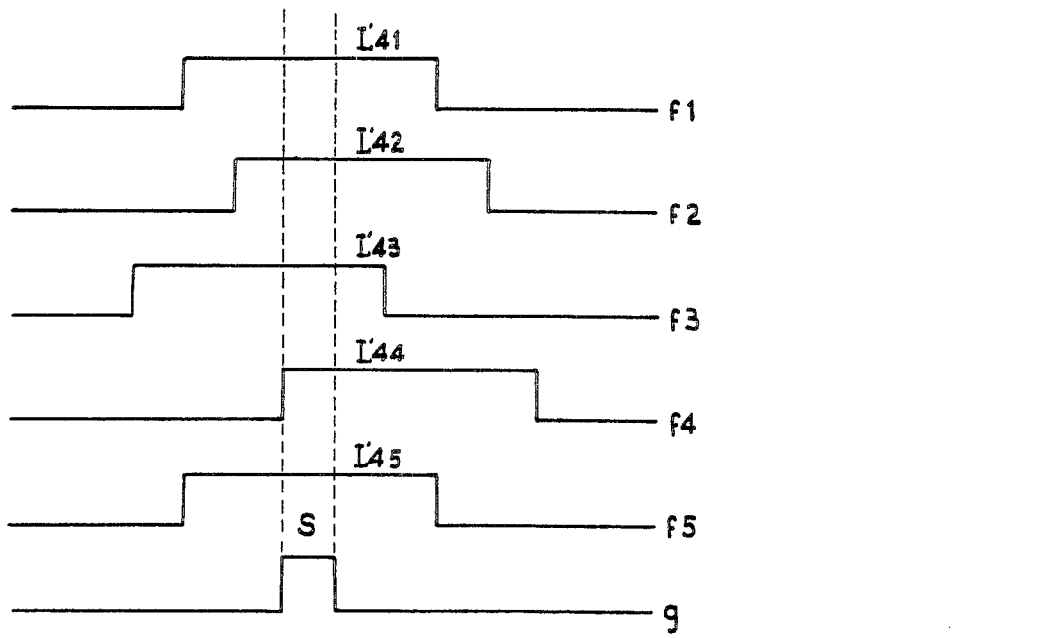

The use of signals transformed in accordance with the preceding description will be apparent by reference to FIGURES 3 and 4.

On the FIGURE 3, signals L41 to L45 are presented which correspond to a five pulse train of signals. These signals have the duration of the time quantum, which is perfectly well determined and, according to the fluctuations which can occur, these signals may shift from one to another quantum. These signals are, then, shaped to have the same duration as the emitted radar pulse. This transformation is shown by the curves of FIGURE 4 where the former signals have become L'41 to L'45. It is to be noticed that all of these signals show a common part (outlined by the vertical dotted lines) which defines on curve 4g the signal S considered as corresponding to the target which produced the five pulses L41 to L45. This single signal S, which geometrically speaking is at the barycentre of the considered pulses, gives, with a very good accuracy, the distance of the target.

Figure 5:
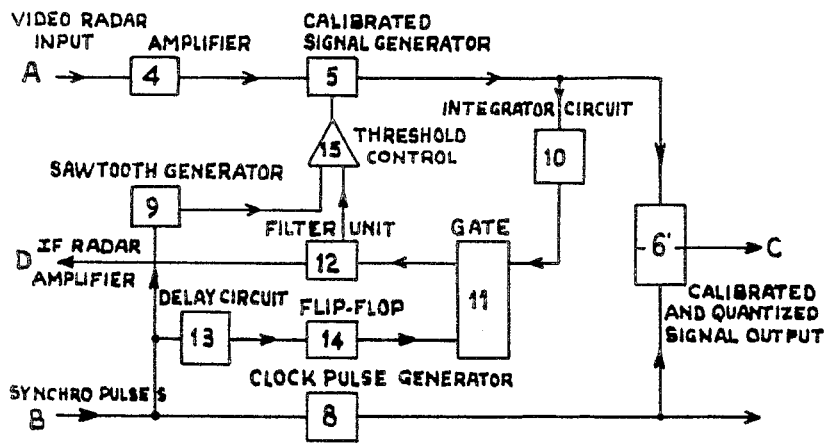
FIGURE 5 is a block diagram of the invention.
Figure 7:
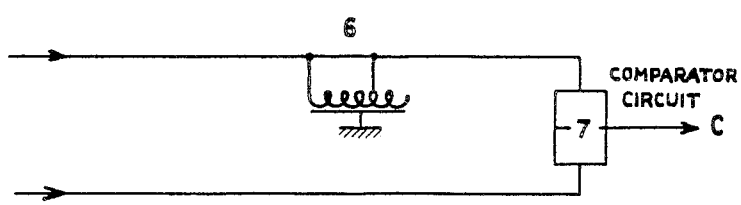

Turning now to FIGURE 5, the video signal pulse with the accompanying noise appears at the input A and is applied to the linear amplifier 4 where the level is raised to trigger the calibrated signal generator 5 producing output signals which are to be time quantized. To discriminate between the noise and the signals provision is made for an adjustment of the triggering threshold of said generator. The circuit 5 is a Schmitt trigger and delivers a calibrated signal representing the desired single video signal pulse. This pulse signal, like m of FIGURE 1, is sent over to comparison circuit 6'. In the circuit 6', the comparison takes place between the pulse m and the clock pulses as delivered by the oscillator or clock pulse generator 8 fed with the synchro pulses of the equipment appearing at B. Circuit 6' is a quick acting flip-flop circuit having two stable states, alternatively triggered by pulses from circuit 5 and circuit 8 respectively. According to the embodiment selected, the circuit 6' may comprise a simple delay line 6 (FIGURE 7) and a comparator 7. The delay of the line is adjusted so that direct pulse m and its image pulse m' are separated by a time interval Δt. Under these conditions, circuit 7 compares the respective positions of pulses m and m' with those of the clock pulses. It is obvious that two succeeding pulses m and m' cannot trigger twice the circuit 7; only the first one is able to, the second one m' having no action upon it (curves 1a, 1b, 1c). In the case of curve 1d, the triggering of circuit 7 takes place for pulses m and m' because they are separated by a clock pulse j. At the output C, there is delivered a single video signal pulse, well calibrated and quantized in time, which is sent to the digital devices which are using it.

Figure 8:
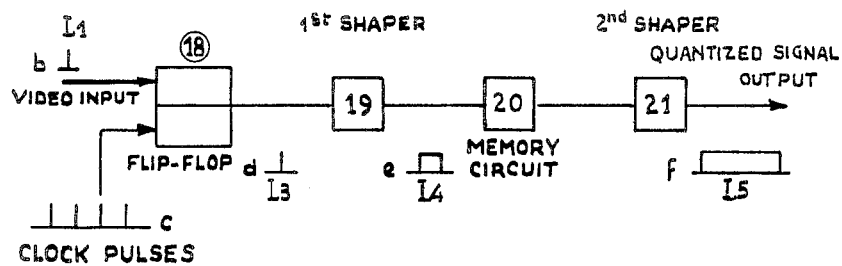
FIGURES 6, 7 and 8, are diagrams of particular circuits which may be used to modify FIGURE 5.

In the second embodiment wherein the image pulse m' is not used, circuit 6' is replaced by the chain of circuits of FIGURE 8 showing where the transformation of the signals is made. Signal L1 (FIG. 2) which corresponds to an already amplitude quantized one, is applied to a half portion of a flip-flop 18 and the other half recives the clock pulses as represented on curve 2c. The resulting output signal is shifted so as to be in phase with the pulse defining a quantum (pulse L3 of FIGURE 2d) and is applied to a first shaping circuit 19 delivering a signal L4 (curve 2e) whose duration is that of the chosen time quantum. This signal is, for instance, applied to a memory circuit 20, which is capable of recording all information pulses having widths equal to or less than the time interval between adjacent clock pulses. At the output of this circuit, the signals are shaped again in a circuit 21, becoming like pulse L5 (curve 2f) whose duration is that of the emitted radar pulse. At the output of circuit 21, there is one or several calibrated signals whose leading edge is in phase with a clock pulse and which corresponds, with an accuracy of the order of one quantum, to the position of the original signal pulse (curve 2a). This transformation of the original signals into calibrated ones allows an easy handling of them and in particular, improves their recording in ferrite core memory where the writing pulses are to be calibrated.

As it has been already noticed, the incoming video signals at A are mixed with noise and it is necessary that the greatest number of signals carrying an information reach a suitable level to trigger the Schmitt circuit 5. The triggering threshold has been already defined as characterizing the false alarm probability level. False alarm ratio is understood to be the number of noise signals whose amplitude is equal to that of the signals carrying an information divided by the number of information signals. This level is adjustable but it is advisable to add an automatic adjustment which takes into account the slightest opportunity to trigger the circuit 5. Obviously, as a general rule, time intervals determined by the synchro pulses of the equipment can determine the maximum range of this equipment. It is admitted that the useful signals, which are received at the end of the repetition period corresponding to the maximum range of the equipment, are mixed with noise which renders their extraction from the surrounding noise extremely difficult. To the circuits of FIGURE 5, there is added a negative feedback circuit which precisely uses the signals corresponding to the maximum range of the equipment to control the circuit 5 triggering threshold. Signals issuing from circuit 5 are applied to integrator 10 and thence to gate 11. This circuit is conductive due to signals delivered by monostable circuit 14. This latter circuit 14 is fed with the synchro pulses of the equipment after they have been delayed in circuit 13. The signals passing through gate 11, which correspond to signals which are collected at the end of the recurrence period of the equipment, are sent to filter 12 delivering a feedback voltage to the input of circuit 5 through circuit 15, which precisely sets the threshold of circuit 5 at the desired level. This feedback voltage may be also utilized to control the gain of the intermediate frequency amplifier of the radar receiver (output D). A supplementary correction may be applied to the triggering of circuit 5 by the control of its threshold, according to the target distance. This action is achieved by means of suitable sawtooth signals issuing from circuit 9 fed with the synchro pulses of the equipment. This correction will add to the action of the threshold control circuit.

Figure 6:
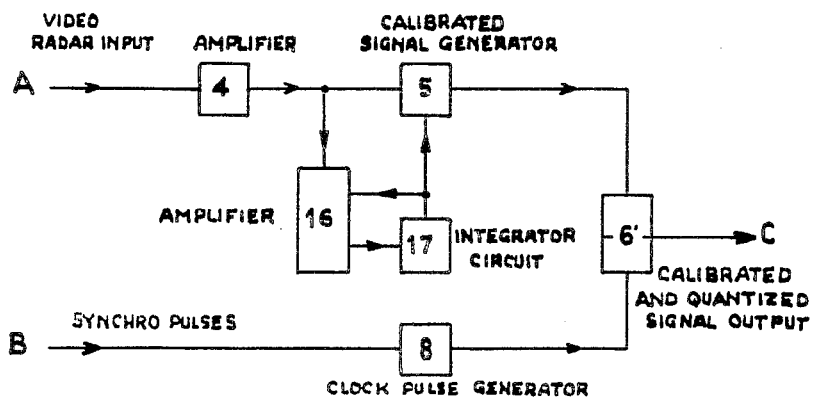

If a small false alarm ratio has been chosen, the preceding circuit can be modified and a feedback circuit like that of FIGURE 6 can be used. The composite video signals feeding amplifier 4 are delivered at a determined level and are applied to a threshold amplifier 16 and to the calibrated signal generator 5. The signals issuing from amplifier 16 are integrated in circuit 17. The output voltage of circuit 17 is applied to both generator 5 and amplifier 16. In that case, there is a control of the threshold of amplifier 16 and of generator 5, respectively. The deviation between them is constant.

In the above described devices, there is supposed only one calibrated signal generator 5. If it is desired to have calibrated pulses, giving information concerning the amplitude of the signals received at A, several generators can be provided whose triggering thresholds are different. By a suitable switching of their output circuits, calibrated pulses will be obtained which are coded according to the amplitude of the input signals which produce them.

A system has been described involving quantification devices for signals which are used in digital circuits associated with radar equipment. This association must be considered as not limiting the scope of the invention.

What is claimed is:

1. An electric signaling system for handling signal information comprising an input circuit receiving signal impulses accompanied by noise impulses, a quantizer circuit controlled by said input circuit and delivering amplitude quantized information signal pulses, a pulse generator producing timing pulses of constant repetition frequency, the interval between adjacent timing pulses defining a time quantum, a comparator circuit controlled jointly by said quantized information pulses and said timing pulses to compare said quantized signal pulses with said timing pulses, and operating to produce an output pulse upon the occurrence of a quantized signal pulse within a quantum interval of said timing pulses, a delay circuit of predetermined time delay interposed between said quantizer circuit and said comparator circuit and controlled by each quantized information pulse for producing a second information pulse separated from said quantized pulse by predetermined time delay interval, said time delay interval being shorter than the interval between adjacent timing pulses, whereby the timing pulse interval is divided into three regions according to the respective positions of the direct information pulse and the delayed information produced by said delay circuit, and said comparator circuit being controlled alternately by an information pulse and a timing pulse, and producing an output pulse depending on the relative positions of said pulses, whereby an output pulse is produced during only one time quantum of said time pulses for each information pulse.

2. A signaling system according to claim 1 wherein the direct information pulse and the delayed information pulse are separated by a timing pulse, whereby an output pulse is produced for each information pulse occurring within a time interval defined by two adjacent quanta.

3. A signaling system according to claim 1 wherein said timing pulses have a high repetition frequency, and said comparator circuit operating to shift the information pulse to set the leading edge thereof in phase coincidence with the nearest timing pulse, and a pulse shaper controlled by the output of said comparator circuit to fix the width of the pulse to a duration equal to the time quantum.

4. A signaling system according to claim 3 wherein said information pulses comprise reflected radar pulses produced by emitted radar pulses, and including a memory circuit for recording all information pulses having a width equal to the time quantum, and a second pulse shaper controlled by recorded pulses for producing pulses of a greater width than said recorded pulses.

5. A signaling system according to claim 1 wherein said received signals are signals produced by radar equipment, and said quantizer circuit includes a calibrated signal generator having a threshold controlling circuit, and including a negative feedback chain controlling said threshold circuit comprising an integrator circuit connected to the output of said calibrated signal generator, a gate circuit controlled by said integrator and by said timing pulses, and a filter unit for supplying a feedback voltage from said gate to said threshold circuit.

6. A signaling circuit according to claim 1 wherein said quantizer circuit includes a calibrated signal generator having a threshold control circuit, and a feedback circuit for energizing said control circuit comprising an amplifier having information pulses and noise pulses supplied to the input thereof and having a threshold control circuit, an integrator controlled by the output of said amplifier, said integrator supplying voltages to said threshold circuits to maintain a constant difference between the threshold levels of said amplifier and said generator.

References Cited by the Examiner

UNITED STATES PATENTS 2,907,027  9/1959  Uskavitch.

ARTHUR GAUSS, *Primary Examiner.*

CHESTER L. JUSTUS, KATHLEEN H. CLAFFY,
*Examiners.*